No. 755,974. Patented March 29, 1904.

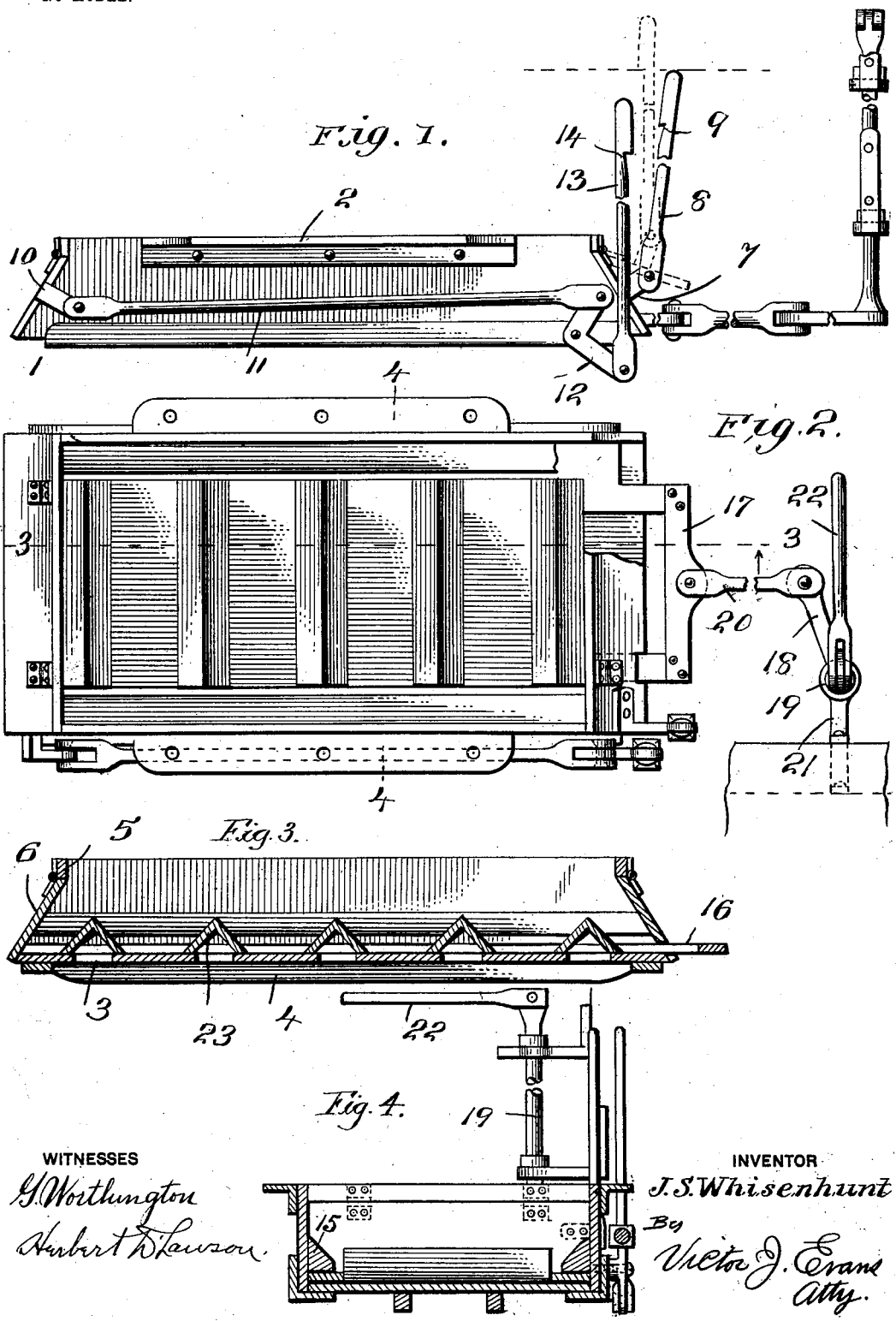

UNITED STATES PATENT OFFICE.

JAMES S. WHISENHUNT, OF EPLEY, MISSISSIPPI.

ASH-PAN FOR LOCOMOTIVES.

SPECIFICATION forming part of Letters Patent No. 755,974, dated March 29, 1904.

Application filed October 21, 1903. Serial No. 177,934. (No model.)

*To all whom it may concern:*

Be it known that I, JAMES S. WHISENHUNT, a citizen of the United States, residing at Epley, in the county of Marion and State of Mississippi, have invented new and useful Improvements in Ash-Pans for Locomotives, of which the following is a specification.

My invention relates to new and useful improvements in ash-pans for locomotives; and its object is to provide a device of this character having a novel arrangement of drafts located at the front and rear of the pan and adapted to be opened or closed by mechanism within convenient reach of the fireman.

Another object is to provide an ash-pan having mechanism which can be readily operated by the fireman and whereby the ashes can be quickly discharged from the bottom of the pan.

With the above and other objects in view the invention consists in providing a pan adapted to be secured to a locomotive in any suitable manner and having inlets at its ends which are normally closed by dampers hinged adjacent thereto. Novel arrangements of levers and rods are provided whereby the fireman can open and close either the front or rear damper without leaving his post.

The invention also consists in providing transversely-extending slots within the bottom of the pan, and these slots are normally closed by cross-bars which are connected to slides adapted to be operated by mechanism within convenient reach of the fireman. When these bars are reciprocated within the pan, the ashes are scraped outward through the slots and the pan is thus quickly cleaned.

The invention also consists in the construction and arrangement of the several parts, which will be more fully hereinafter described and claimed, and illustrated in the accompanying drawings, wherein—

Figure 1 is a side elevation of the ash-pan with the levers broken away. Fig. 2 is a plan view thereof. Fig. 3 is a section on the line 3 3, Fig. 2. Fig. 4 is a section on the line 4 4, Fig. 2.

Referring to the drawings by numerals of reference, 1 is a pan of any suitable construction, preferably provided with flanged side plates 2, whereby the same can be readily fastened to a locomotive. Transversely-extending slots 3 are formed in the bottom of the pan, and longitudinally-extending supporting-bars 4 are preferably arranged along the lower surface of the bottom of the pan. Cross-bars 5 are provided along the upper edges of the ends of the pan, and to these bars are hinged dampers 6, which are normally seated by gravity upon the ends of the bottom of the pan and serve to close said ends. The damper at one end of the pan is provided with an ear 7, to which is pivoted a lever 8, having a recessed portion 9, adapted to engage a bracket or other suitable device whereby the said damper can be held in raised or open position, as illustrated in dotted lines in Fig. 1. An arm 10 is secured to or formed integral with the other damper, and pivoted thereto is a rod 11, which extends longitudinally of the pan and is connected to one end of a bell-crank lever 12, the free end of which has a lever 13 pivoted thereto. This lever is substantially similar to the lever 8, before referred to, and has a notch 14 therein for engaging a supporting-bracket.

Longitudinally-extending cleats 15 are arranged upon the inner faces of the sides of the ash-pan and are parallel with the bottom thereof, and mounted upon the bottom of the pan and below these cleats are parallel slide-bars 16, connected at one end by a cross-head 17. This cross-head is secured to the arm 18 of a revoluble shaft 19 by means of a link 20. The shaft 19 is journaled in brackets 21, provided therefor, and has an operating-lever 22 connected to one end thereof. Bars 23 are secured upon the slide-bars 16 and are normally in position over the slots 3. These bars are preferably struck from sheet metal and in cross-section are in the form of inverted V's.

The cleats or guides 15 have their upper surfaces inclined downwardly, as clearly shown by Fig. 4, to avoid the formation of catching means or shoulders that would retain ashes within the pan, irrespective of the operation of the devices for clearing the ashes from or causing the latter to pass out through the slots 3. Between the inner edges of the cleats or guides 15 and the opposite ends of the inverted-V-shaped bars 23 spaces are formed, and said bars have their opposite ends fully open and project above the lower or base sides of the guides. By reason of this arrangement the ashes or cinders that may fall on the cleats or guides 15 are caused to move inwardly toward the opposite ends of the inverted-V-shaped bars 23, and when the latter are moved or reciprocated in opposite directions the said material falling over the cleats or guides is caused to be forced out through the slots 3, thus insuring a complete removal of the ashes, cinders, or other accumulations resulting from combustion from the pan. Furthermore, fine ashes moving downwardly over the upper inwardly-inclined surface of the cleats or guides 15 will to a large extent pass into the opposite open ends of the bars 23 and downwardly through the slots 3, this movement of the finer ashes being caused by the vibration of the locomotive.

By raising either of the levers 13 and placing them in engagement with a bracket provided therefor the damper connected to said lever can be opened, and it will therefore be understood that the fireman can open either end of the ash-pan without leaving his post. In this manner the supply of air to the fuel above the ash-pan can be regulated. Ashes accumulating within the pan can be quickly removed therefrom by reciprocating the arm 22, which in turn causes shaft 19 to rotate backward and forward and carry its arm 18 therewith. A reciprocating movement will thus be imparted to the slide-bars 16 and the cross-bars 23 connected thereto. These cross-bars when moved from their normal positions uncover the slots 3 and also serve to scrape the ashes from the bottom of the pan into the slots. By reciprocating these bars the ashes can be discharged without the necessity of the fireman leaving his post within the cab.

It will be seen that the device herein described is very simple and inexpensive in construction and can be readily attached to locomotives of various constructions. By its use the accumulation of clinkers within the ash-pan is prevented, and as the live coals drop into said pan they can be quickly removed and burning of the metal of which the device is constructed is prevented. Moreover, it is unnecessary for the fireman to get under the locomotive in order to clean the grate or the ash-pan thereunder, and therefore the danger incident to such an operation is obviated.

Having thus fully described the invention, what is claimed as new is—

An ash-pan of the class set forth, comprising sides, a bottom having transversely-extending slots therein and opposite end dampers, means for operating the said dampers, guides extending inwardly from the opposite sides of the pan and having their lower base sides above the bottom, the upper sides of the guides being inclined inwardly to provide release-surfaces for ashes or other products of combustion that may fall thereon, and sliding means disposed on the bottom and having transversely-arranged inverted-V-shaped tubular bars open at their lower sides and held in close relation to the bottom of the pan, the said bars being materially spaced apart from each other to have their lower edges act as scraping means on the bottom and also projected above the lower or base sides of the guides, the opposite ends of the bars being open and terminating at a distance from the inner edges of the guides, the said guides having their upper surfaces inclined toward the open ends of the bars, and mechanism for operating the said slide means.

In testimony whereof I affix my signature in presence of two witnesses.

JAMES S. WHISENHUNT.

Witnesses:
  T. W. CANTWELL,
  L. L. POWELL.